(12) United States Patent
Wu et al.

(10) Patent No.: US 12,284,548 B2
(45) Date of Patent: Apr. 22, 2025

(54) WIRELESS COMMUNICATION DEVICE AND DATA PROCESSING METHOD

(71) Applicant: Realtek Semiconductor Corp., HsinChu (TW)

(72) Inventors: Yu-Jui Wu, HsinChu (TW); Ting-Wei Huang, HsinChu (TW); Hsuan-Yen Chung, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 371 days.

(21) Appl. No.: 17/866,575

(22) Filed: Jul. 18, 2022

(65) Prior Publication Data

US 2023/0048883 A1 Feb. 16, 2023

(51) Int. Cl.
*H04W 28/02* (2009.01)
*H04W 24/04* (2009.01)

(52) U.S. Cl.
CPC ....... *H04W 28/0278* (2013.01); *H04W 24/04* (2013.01)

(58) Field of Classification Search
CPC ......... H04W 28/0278; H04W 28/0284; H04W 28/289; H04W 28/065; H04W 28/06; H04W 28/0958; H04W 28/14; H04W 24/04; H04W 24/08; H04W 72/12
See application file for complete search history.

(56) References Cited

U.S. PATENT DOCUMENTS

| | | | |
|---|---|---|---|
| 11,438,791 B1* | 9/2022 | Marupaduga | H04L 45/28 |
| 2006/0023729 A1* | 2/2006 | Choi | H04N 21/23406 370/428 |
| 2010/0011383 A1* | 1/2010 | Abdul Kader Jailani | H04L 41/0846 719/330 |
| 2010/0040007 A1* | 2/2010 | Itagaki | H04W 28/10 370/329 |
| 2017/0215218 A1* | 7/2017 | Adachi | H04L 1/08 |
| 2021/0037559 A1* | 2/2021 | Hande | H04L 67/06 |
| 2021/0045014 A1* | 2/2021 | Yi | H04L 1/06 |
| 2023/0033744 A1* | 2/2023 | Kishida | H04W 28/0247 |
| 2023/0362718 A1* | 11/2023 | Sugaya | H04W 28/10 |

FOREIGN PATENT DOCUMENTS

CN 112969201 A * 6/2021 ......... H04L 43/0829

* cited by examiner

*Primary Examiner* — Sudesh M Patidar
(74) *Attorney, Agent, or Firm* — Winston Hsu

(57) ABSTRACT

A wireless communication device includes a transceiver device and a data processing device. The transceiver device receives a frame from a wireless communication channel. The data processing device receives the frame and determines whether at least one of multiple predetermined frames has been received or is about to be received according to the frame. The data processing device enables a batch-frame indication mechanism when determining that said at least one of the multiple predetermined frames has been received or is about to be received. When the batch-frame indication mechanism is enabled, every time when one of the multiple predetermined frames is received, it is buffered in a reception queue instead of issuing a fetch indication, and when a number of predetermined frames buffered in the reception queue reaches a predetermined batch size, the data processing device issues the fetch indication to a back-end processing device.

7 Claims, 3 Drawing Sheets

WIRELESS COMMUNICATION DEVICE AND DATA PROCESSING METHOD

BACKGROUND OF THE INVENTION

1. Field of the Invention

The invention relates to a data processing method applied in a wireless communication device and the associated data processing device, more particular to a data processing method and data processing device capable of reducing additional overhead in a high-throughput environment.

2. Description of the Prior Art

In the wireless network standard 802.11n, the concept of frame aggregation, which combines multiple frames/subframes into a large frame or a packet, is added. The methods of frame aggregation includes Aggregate MAC (Medium Access Control) layer Service Data Unit (A-MSDU) and Aggregate MAC layer Protocol Data Unit (A-MPDU).

FIG. 1 is a schematic diagram illustrating the A-MSDU and the A-MPDU. The A-MSDU is formed by adding a header HDR to the head and some padding data PDD, when necessary, to the tail of the MAC layer service data unit MSDU to become an MSDU sub-frame, and then aggregating multiple MSDU sub-frames (such as the MSDU sub-frame #1~MSDU sub-frame #N shown in FIG. 1) to become an A-MSDU. The MPDU is formed by adding a MAC header MACHDR to the head and a Frame Check Sequence FCS to the tail of the A-MSDU. The MPDU sub-frame is formed by adding the MPDU delimiter to the head and some padding data PDD, when necessary, to the tail of the MPDU. Finally, the A-MPDU is formed by aggregating multiple MPDU sub-frames (such as the MPDU sub-frame #1~MPDU sub-frame #N shown in FIG. 1). The physical header PHYHDR may further be added to the head of the A-MPDU. By sending multiple MPDU frames (which may be called sub-frames when being aggregated) at one time, the system throughput can be effectively improved.

However, in the high throughput environment, when the A-MPDUs arrive at a dense rate, a great amount of overhead will be generated at the operating system due to frame processing.

To solve this problem, a data processing method applied in a wireless communication device and the associated data processing device are proposed.

SUMMARY OF THE INVENTION

It is an objective of the invention to solve the problem of large processing overhead when the frames arrive at a dense rate in a short time.

According to an embodiment of the invention, a wireless communication device comprises a transceiver device and a data processing device. The transceiver device is configured to receive at least one frame from a wireless communication channel. The data processing device is coupled to the transceiver device and configured to receive said at least one frame and determine whether at least one of a plurality of predetermined frames has been received or is about to be received according to said at least one frame. The data processing device is configured to enable a batch-frame indication mechanism when the data processing device determines that said at least one of the plurality of predetermined frames has been received or is about to be received. When the batch-frame indication mechanism is enabled, every time when the data processing device receives one of the plurality of predetermined frames, the data processing device buffers said one of the plurality of predetermined frames in a reception queue instead of issuing a fetch indication, and when a number of the plurality of predetermined frames buffered in the reception queue reaches a predetermined batch size, the data processing device issues the fetch indication to a back-end processing device.

According to another embodiment of the invention, the data processing method comprises: receive at least one frame from a wireless communication channel; determining whether at least one of a plurality of predetermined frames has been received or is about to be received according to said at least one frame; and enabling a batch-frame indication mechanism when it is determined that said at least one of the plurality of predetermined frames has been received or is about to be received. When the batch-frame indication mechanism is enabled, the data processing method further comprises: buffering one of the plurality of predetermined frames in a reception queue instead of issuing a fetch indication every time when said one of the plurality of predetermined frames is received; and issuing the fetch indication to a back-end processing device when a number of the plurality of predetermined frames buffered in the reception queue reaches a predetermined batch size.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
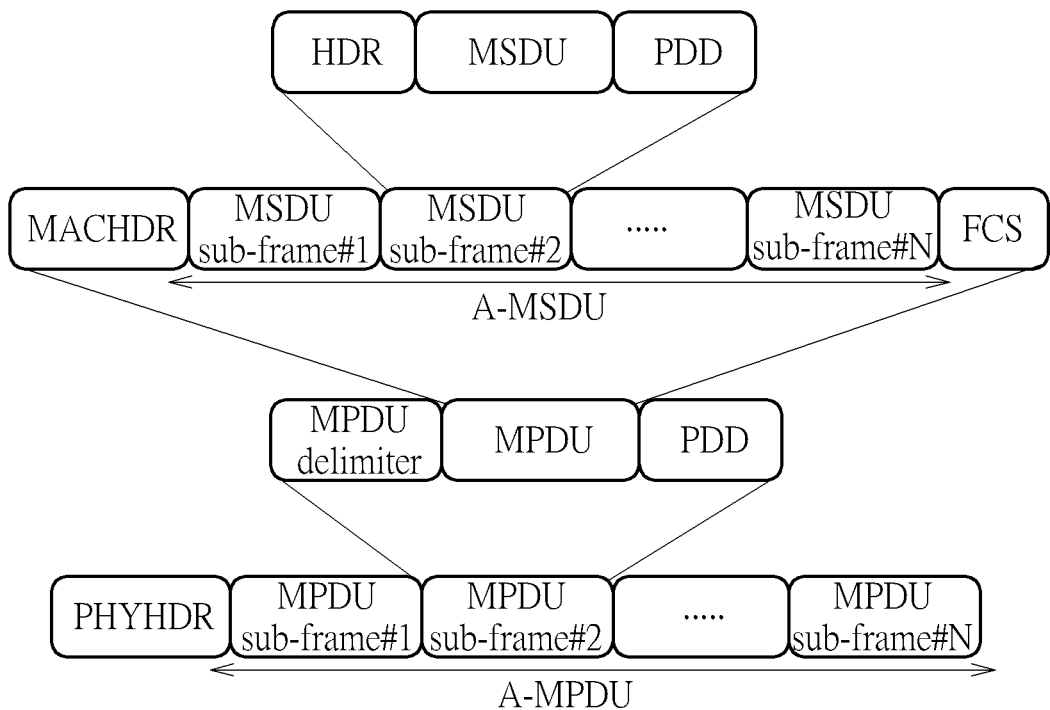
FIG. 1 is a schematic diagram illustrating the A-MSDU and the A-MPDU.
Figure 2:
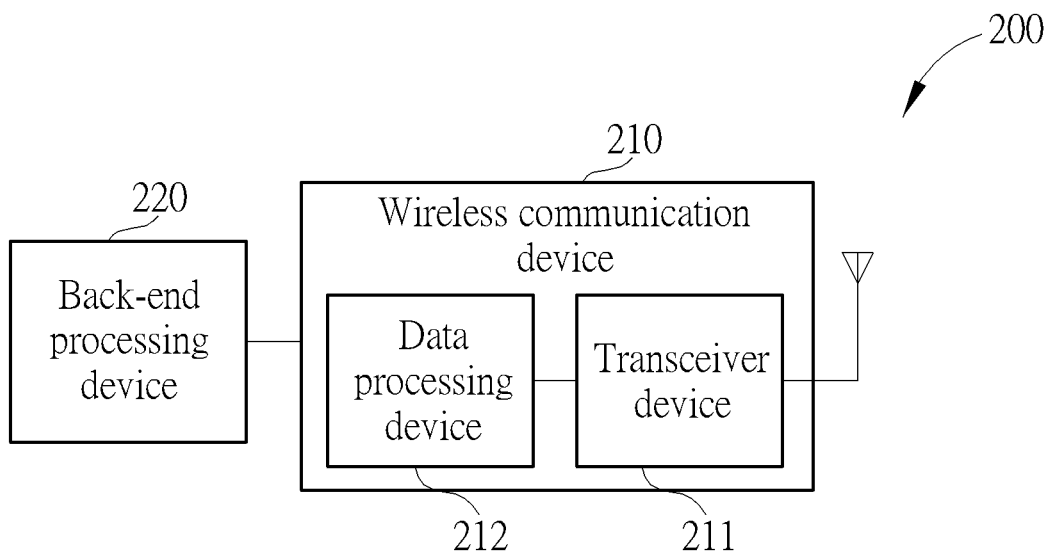
FIG. 2 is an exemplary block diagram of an electronic device according to an embodiment of the invention.

FIG. 2 is an exemplary block diagram of an electronic device according to an embodiment of the invention. The electronic device 200 may comprise a wireless communication device 210 and a back-end processing device 220. In one embodiment, the electronic device 200 may be an electronic product with wireless communication capabilities, such as a mobile phone, a notebook computer, a desktop computer, etc. The wireless communication device 210 may be a wireless network card for providing wireless communication services, and the back-end processing device 220 may be a processor of the electronic device 200, e.g., a processor for running an operating system of the electronic device 200.

The wireless communication device 210 may comprise a transceiver device 211 and a data processing device 212. The transceiver device 211 is configured to receive one or more frames from a wireless communication channel. The data processing device 212 is coupled to the transceiver device 211 and configured to receive the frames from the transceiver device 211 and process the frames. The back-end processing device 220 receives the preliminarily processed frames from the wireless communication device 210 and may further process the received frames.

It is to be noted that, in order to clarify the concept of the invention, FIG. 2 is a simplified block diagram of an electronic device in which only the components relevant to the invention are shown. As will be readily appreciated by a person of ordinary skill in the art, an electronic device may further comprise other components not shown in FIG. 2 and configured to implement the functions of wireless communication and some related signal processing.

According to an embodiment of the invention, the data processing device 212 is configured to determine whether at least one of a plurality of predetermined frames has been received or is about to be received according to a received frame, and when said at least one of the plurality of predetermined frames has been received or is about to be received is determined, the data processing device 212 may enable a batch-frame indication mechanism. Conversely, when it is determined that a plurality of predetermined frames have not been received by the wireless communication device 210 and/or will not be received by the wireless communication device 210 in the future, if the batch-frame indication mechanism has been enabled, the data processing device 212 may disable the batch-frame indication mechanism.

According to an embodiment of the invention, when the batch-frame indication mechanism is enabled, every time when the data processing device 212 receives one of the plurality of predetermined frames, the data processing device 212 buffers said one of the plurality of predetermined frames in a reception queue instead of issuing a fetch indication, and when the number of predetermined frames buffered in the reception queue reaches a predetermined batch size, the data processing device 212 issues the fetch indication to the back-end processing device 220, as an example, issuing a fetch indication to the operating system of the back-end processing device 220, for indicating to fetch the frames. Upon receiving the fetch indication, the operating system may fetch the frames from the reception queue. In an embodiment, the operating system may acquire the frame by calling a function provided by the data processing device 212. For example, but not limited to, the operating system may trigger the data processing device 212 to fetch the frames from the reception queue and provide the fetched frame to the operating system by calling a function. In another embodiment, the operating system may request for the right for accessing the reception queue 350 shown in FIG. 3 to acquire the frame after receiving the fetch indication.

In an embodiment of the invention, the back-end processing device 220 or operating system may acquire a plurality of predetermined frames (also referred to as a batch of frames, in which the number of predetermined frames may be less than or equal to the predetermined batch size) in response to one fetch indication, and then perform the process a batch of frames.

Figure 3:
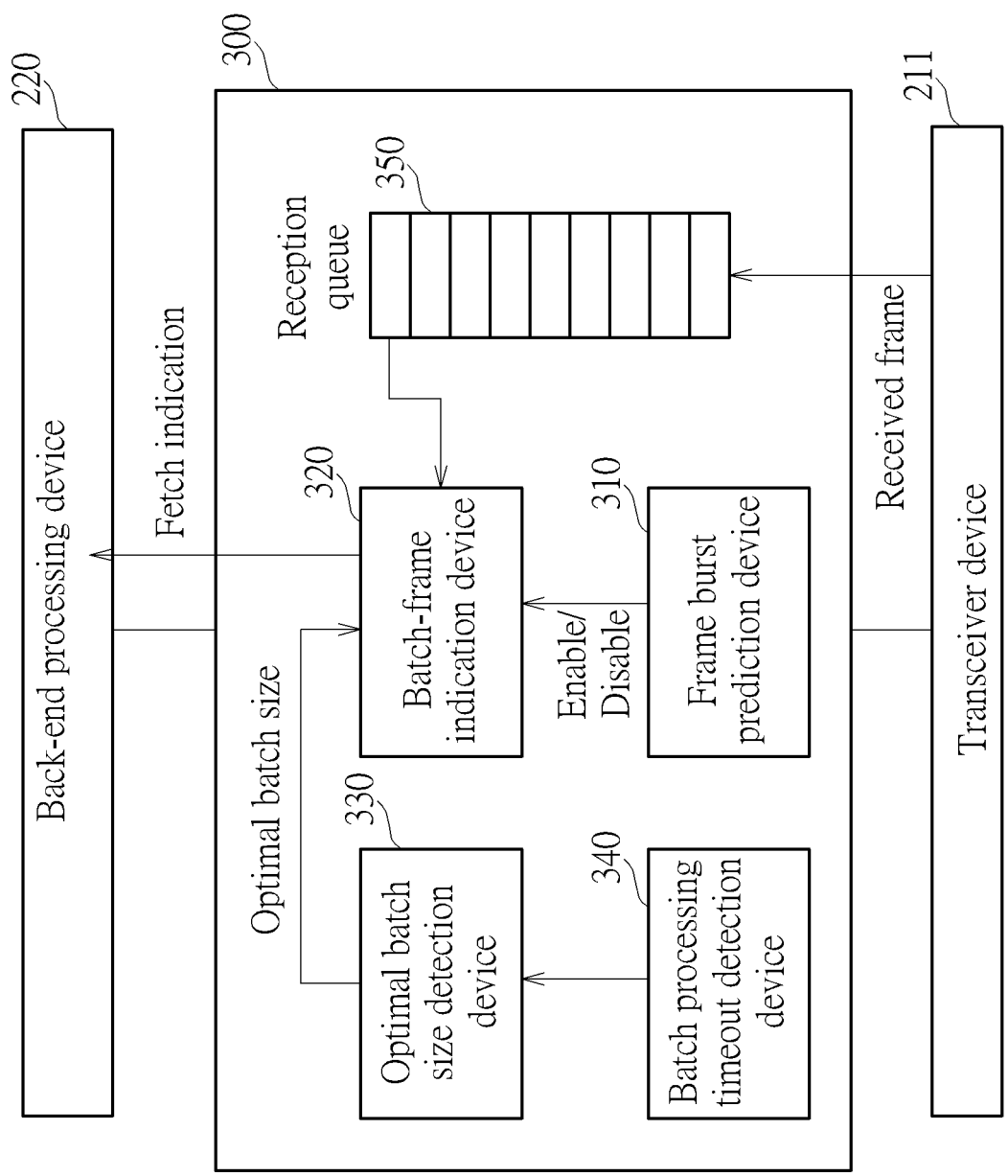
FIG. 3 is a block diagram of a wireless communication device according to an embodiment of the invention.

FIG. 3 is a block diagram of a wireless communication device according to an embodiment of the invention, which is mainly configured to illustrate the corresponding devices implementing the proposed batch-frame indication mechanism. The data processing device 300 may comprise a frame burst prediction device 310, a batch-frame indication device 320, an optimal batch size detection device 330, a batch processing timeout detection device 340 and a reception queue 350. The frame burst prediction device 310 is configured to determine whether said at least one of the plurality of predetermined frames has been received or is about to be received, and when it is determined that said at least one of the plurality of predetermined frames has been received or is about to be received, the frame burst prediction device 310 is configured to notify the batch-frame indication device 320 to enable the batch-frame indication mechanism. The batch-frame indication device 320 is configured to issue the fetch indication to the back-end processing device 220 when the number of the plurality of predetermined frames buffered in the reception queue 350 reaches the predetermined batch size. The optimal batch size detection device 330 is configured to selectively operate in a detecting mode and a fine-tuning mode and dynamically adjust the predetermined batch size in the detecting mode and the fine-tuning mode. The result of adjustment will be provided to the batch-frame indication device 320. The batch processing timeout detection device 340 is configured to determine whether a batch processing timeout has occurred. The result of batch processing timeout detection may be provided to the optimal batch size detection device 330 as a reference for switching between the detecting mode and the fine-tuning mode.

According to an embodiment of the invention, the frame burst prediction device 310 determines whether said at least one of the plurality of predetermined frames has been received or is about to be received based on whether a received frame is an aggregate frame. As an example, the frame burst prediction device 310 may determine whether a large number of frames will arrive in a short period of time according to a frame type of the received frame. In an embodiment of the invention, the predetermined frame may be the aforementioned MPDU frame, and the aggregate frame may be an A-MPDU having a plurality of MPDU frames aggregated therein. As an example, the frame burst prediction device 310 may parse the content of the header of a received frame to determine whether an A-MPDU flag is set. If the A-MPDU flag is set, it is determined that this frame is an A-MPDU and the batch-frame indication mechanism can be enabled. For another example, the frame burst prediction device 310 may make the prediction based on a setting value of the maximum number of frame aggregation negotiated by the electronic device 200 and another peer device (e.g. an Access Point (AP) device, or a terminal device (Station)). If the negotiated setting value is greater than 1, it means that the received frame may be an aggregate frame, and the frame burst prediction device 310 may determine to enable the batch-frame indication mechanism.

It is to be noted that, in the embodiments of the invention, the frame burst prediction device 310 determines that the frame is an A-MPDU according to the content of the header, it may immediately activate or enable the batch-frame indication mechanism when receiving the first MPDU frame. In addition, in the embodiment of the invention, said A-MPDU may include or may not include the A-MSDU.

When the batch-frame indication mechanism is enabled, the batch-frame indication device 320 is configured to issue the fetch indication to the back-end processing device 220 when the number of the plurality of predetermined frames buffered in the reception queue 350 reaches the predetermined batch size. On the other hand, when the frame burst prediction device 310 notifies that the batch-frame indication mechanism is disabled, the batch-frame indication device 320 no longer has to wait for the number of frames buffered in the reception queue 350 to reach the predetermined batch size and then issue the fetch indication.

In addition, the proposed data processing method further comprises timeout processing mechanisms. When the number of predetermined frames buffered in the reception queue 350 has not reached the predetermined batch size but the batch-frame indication device 320 determines that a buffer timeout has occurred, the batch-frame indication device 320 may also issue the fetch indication to the back-end processing device 220 immediately to avoid excessive frame delay. For example, after issuing a fetch indication, the batch-frame indication device 320 may reset and recalculate the operation time of buffering the predetermined frames in the reception queue 350. If the operation time has reached a timeout threshold Time_Out_TH before the number of predetermined frames buffered in the reception queue 350 reaches the currently set predetermined batch size, the batch-frame indication device 320 may determine that a buffer timeout has occurred. In the embodiment of the invention, the timeout threshold Time_Out_TH may be set according to system requirements.

Regarding the batch processing timeout detection, according to an embodiment of the invention, the batch processing timeout detection device 340 may estimate a burst size. For example, the burst size Y is estimated according to the setting value of the maximum number of frame aggregation negotiated by the electronic device 200 and another peer device. Assuming that the setting value of the maximum number of frame aggregations is 64, it means that a maximum of 64 MPDU frames can be aggregated in one A-MSDU. The batch processing timeout detection device 340 may set the burst size Y to 64, or set it to a value obtained after some proper operations based on the value 64. Next, the batch processing timeout detection device 340 may estimate the data size for this reception according to the burst size Y For example, assuming that the estimated data size of an MPDU frame is X bytes, the batch processing timeout detection device 340 may estimate the data size for this reception to be (Y*X) bytes.

Then, the batch processing timeout detection device 340 may estimate the maximum allowable processing time for this burst, herein referred to as burst processing time Burst_Processing_Time for brevity, according to the estimated data size and some data processing related parameters (e.g., the ideal throughput of the operating system, which may be in bytes/sec). The aforementioned processing time may be, for example, but not limited to, the processing time required in the Transmission Control Protocol (TCP) layer of the data processing device 212/300 and/or the back-end processing device 220.

Finally, the batch processing timeout detection device 340 may estimate the maximum allowable processing time of a batch, herein referred to as batch processing time Batch_Processing_Time for brevity, according to the burst processing time Burst_Processing_Time and the currently set predetermined batch size. For example, if the predetermined batch size B is currently set to ⅓ of the burst size Y, the batch processing time Batch_Processing_Time may be set to ⅓ of the burst processing time Burst_Processing_Time, or another value obtained by adding some proper increment or decrement to this value.

The batch processing timeout detection device 340 may determine whether a batch processing timeout occurs according to the batch processing time Batch_Processing_Time. If the time taken by the back-end processing device 220 to process a batch of frames exceeds the currently set batch processing time Batch_Processing_Time, it is determined that a batch processing timeout occurs. In an embodiment of the invention, after processing a batch of frames, the back-end processing device 220 may send a notification to the data processing device 300 to inform the data processing device 300 that the processing of a batch of frames has completed and a next batch of frames can be received for processing or to inform the data processing device 300 of the returning of the access right of the reception queue 350.

Therefore, the batch processing timeout detection device 340 may determine whether a batch processing timeout has occurred according to the time it takes for the data processing device 300 to receive the aforementioned notification form the back-end processing device 220 for informing that the processing of a batch of frames has completed after the back-end processing device 220 acquires the batch of frames. The determination result of batch processing timeout may be provided to the optimal batch size detection device 330 as a reference for switching between the detecting mode and the fine-tuning mode.

Regarding the detection and adjustment of the predetermined batch size/optimal batch size, according to an embodiment of the invention, when the batch-frame indication mechanism is enabled, if there is a record of a previous predetermined batch size, the optimal batch size detection device 330 may directly use the recorded value as the initial value of the predetermined batch size and operate in fine-tuning mode. If not, the optimal batch size detection device 330 may set the initial value of the predetermined batch size to 1 and operates in the detecting mode.

In the detecting mode, every time when the back-end processing device 220 acquires a batch of frames and no batch processing timeout has occurred, the optimal batch size detection device 330 may increase the predetermined batch size (that is, increase the value of the predetermined batch size). On the contrary, if the batch processing timeout detection device 340 determines that a batch processing timeout has occurred, the optimal batch size detection device 330 may decrease the predetermined batch size (that is, decrease the value of the predetermined batch size), record the current value of the predetermined batch size, and set it as a batch size threshold Batch_Size_Threshold, and enter the fine-tuning mode.

According to an embodiment of the invention, in the detecting mode, the optimal batch size detection device 330 may exponentially increase the predetermined batch size. For example, if the batch processing timeout has not occurred, the optimal batch size detection device 330 may double the predetermined batch size in each adjustment. Therefore, ideally, the predetermined batch size may grow exponentially as the sequence 1, 2, 4, 8 . . . grown in multiples. If the batch processing timeout has occurred, the optimal batch size detection device 330 may halve the predetermined batch size, set the current predetermined batch size (that is, after being halved) as the batch size threshold Batch_Size_Threshold, and enter the fine-tuning mode.

In the fine-tuning mode, every time when the back-end processing device 220 acquires a batch of frames and no batch processing timeout has occurred, the optimal batch size detection device 330 may increase the predetermined batch size (that is, increase the value of the predetermined batch size). On the contrary, if the batch processing timeout detection device 340 determines that a batch processing timeout has occurred, the optimal batch size detection device 330 may decrease the predetermined batch size (that is, decrease the value of the predetermined batch size). When the value of the predetermined batch size is decreased to a value lower than the batch size threshold Batch_Size_Threshold, the detecting mode is retuned.

According to an embodiment of the invention, in the fine-tuning mode, the optimal batch size detection device 330 may increase or decrease the predetermined batch size by a fixed increment or a fixed decrement. For example, the optimal batch size detection device 330 may increase or decrease the predetermined batch size by one in each adjustment.

After each adjustment, the optimal batch size detection device 330 may regard the adjusted predetermined batch size as the current optimal batch size and provide it to the batch-frame indication device 320.

It is to be noted that, in other embodiments of the invention, the operations of the optimal batch size detection device 330 and the batch processing timeout detection device 340 may also be omitted. For example, the predetermined batch size may be a fixed value and will not be adjusted dynamically.

In addition, it is to be noted that, although the data processing device 300 and the back-end processing device 220 are respectively drawn as two different hardware devices in FIG. 3, the invention is not limited thereto. In other embodiments of the invention, the data processing device 212/300 and the back-end processing device 210 may also be implemented in the same processing device, or may actually be the same processor. In addition, the invention is not limited to use dedicated hardware to perform the above operations. In other embodiments of the invention, the proposed data processing method may also be implemented by software and/or firmware, or implemented by software, hardware, firmware, or any combination thereof. For example, in the embodiment of the invention, the electronic device 200 may actually comprise one or more processors, and may optionally be combined with one or more other hardware devices to implement the proposed data processing method.

Figure 4:
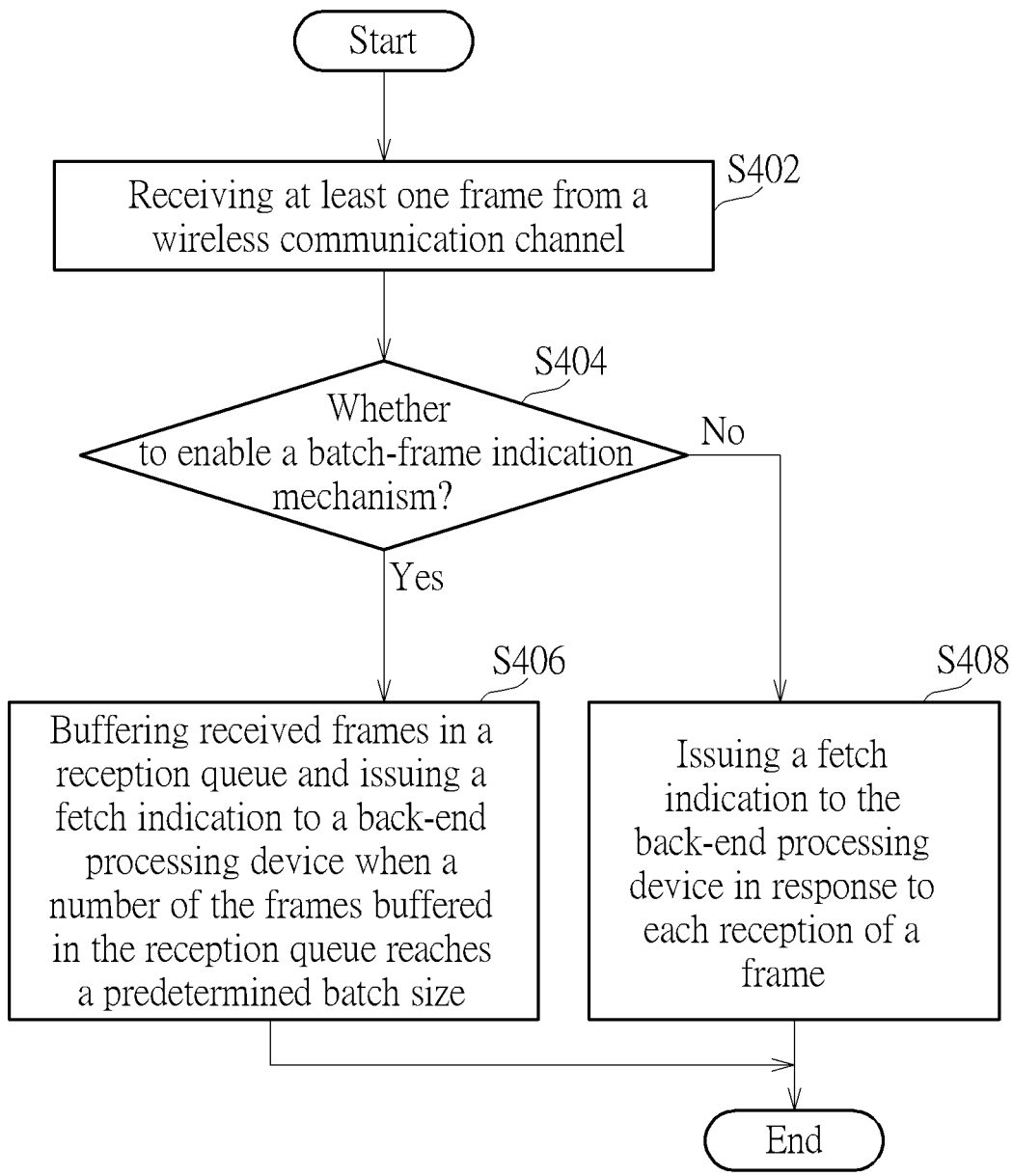
FIG. 4 is a flowchart of a data processing method according to an embodiment of the invention.

FIG. 4 is a flowchart of a data processing method according to an embodiment of the invention, comprising the following steps:

Step S402: receiving at least one frame from a wireless communication channel Step S404: determining whether to enable a batch-frame indication mechanism based on the received frame. If yes, step S406 is performed. If no, step S408 is performed.

Step S406: buffering received frames in a reception queue and issuing a fetch indication to a back-end processing device when a number of the frames buffered in the reception queue reaches a predetermined batch size.

Step S408: issuing a fetch indication to the back-end processing device in response to each reception of a frame.

In the embodiments of the invention, when it is determined that a large number of frames will arrive in a short period of time, the batch-frame indication mechanism is enabled. Different from the conventional art, the proposed data processing device buffers the frames in a reception queue instead of immediately issuing a fetch indication, and the fetch indication will not be sent to the operating system until number of the frames buffered in the reception queue reaches a predetermined batch size. In this manner, the problem of large overhead due to frequent context switch in the operating system in a high-throughput environment is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication device, comprising:
   a transceiver device, configured to receive at least one frame via a wireless communication channel; and
   a data processing device, coupled to the transceiver device and configured to receive the at least one frame and determine whether at least one of a plurality of predetermined frames has been received or is about to be received according to the at least one frame, wherein the data processing device comprises:
   a frame burst prediction device, configured to determine whether the at least one of the plurality of predetermined frames has been received or is about to be received,
      wherein the frame burst prediction device determines whether the at least one of the plurality of predetermined frames has been received or is about to be received based on whether the at least one frame is an aggregate frame,
   wherein the data processing device is configured to enable a batch-frame indication mechanism when the data processing device determines that the at least one of the plurality of predetermined frames has been received or is about to be received, and
   when the batch-frame indication mechanism is enabled, every time when the data processing device receives one of the plurality of predetermined frames, the data processing device buffers the one of the plurality of predetermined frames in a reception queue instead of issuing a fetch indication, and when a number of the plurality of predetermined frames buffered in the reception queue reaches a predetermined batch size, the data processing device issues the fetch indication to a back-end processing device,
   wherein the data processing device is further configured to dynamically adjust the predetermined batch size after the batch-frame indication mechanism is enabled, and the data processing device further comprises:
   an optimal batch size detection device, selectively operating in a detecting mode and a fine-tuning mode, wherein in the detecting mode, the optimal batch size detection device is configured to exponentially increase the predetermined batch size, and in the fine-tuning mode, the optimal batch size detection device is configured to increase or decrease the predetermined batch size by a fixed increment or a fixed decrement; and
   a batch processing timeout detection device, configured to determine whether a batch processing timeout has occurred,
   wherein when the optimal batch size detection device operates in the detecting mode and when the batch processing timeout detection device determines that the batch processing timeout has occurred, the batch processing timeout detection device is configured to notify the optimal batch size detection device to decrease the predetermined batch size and switches from the detecting mode to the fine-tuning mode.

2. The wireless communication device of claim 1, wherein the plurality of predetermined frames are MPDU (Medium Access Control Protocol Data Unit) frames, and the aggregate frame is an A-MPDU (Aggregate MPDU) having a plurality of MPDU frames aggregated therein.

3. The wireless communication device of claim 1, wherein the data processing device is further configured to determine whether buffer timeout has occurred before the number of the plurality of predetermined frames buffered in the reception queue reaches the predetermined batch size, and when the data processing device determines that buffer timeout has occurred, the data processing device immediately issues the fetch indication to the back-end processing device.

4. A data processing method, comprising:
receive at least one frame via a wireless communication channel;
determining whether at least one of a plurality of predetermined frames has been received or is about to be received according to the at least one frame, wherein whether the at least one of the plurality of predetermined frames has been received or is about to be received is determined based on whether the at least one frame is an aggregate frame; and
enabling a batch-frame indication mechanism when it is determined that the at least one of the plurality of predetermined frames has been received or is about to be received,
wherein when the batch-frame indication mechanism is enabled, the data processing method further comprises:
buffering one of the plurality of predetermined frames in a reception queue instead of issuing a fetch indication every time when the one of the plurality of predetermined frames is received;
issuing the fetch indication to a back-end processing device when a number of the plurality of predetermined frames buffered in the reception queue reaches a predetermined batch size;
adjusting the predetermined batch size in a detecting mode and a fine-tuning mode, wherein in the detecting mode, the predetermined batch size is increased exponentially and in the fine-tuning mode, the predetermined batch size is increased by a fixed increment or decreased by a fixed decrement;
determining whether a batch processing timeout has occurred; and
decreasing the predetermined batch size and switching from the detecting mode to the fine-tuning mode when the predetermined batch size is adjusted in the detecting mode and the batch processing timeout is determined to have occurred.

5. The data processing method of claim 4, wherein the plurality of predetermined frames are MPDU (Medium Access Control Protocol Data Unit) frames, and the aggregate frame is an A-MPDU (Aggregate MPDU) having a plurality of MPDU frames aggregated therein.

6. The data processing method of claim 4, wherein when the batch-frame indication mechanism is enabled, the data processing method further comprises:
determining whether buffer timeout has occurred before the number of the plurality of predetermined frames buffered in the reception queue reaches the predetermined batch size; and
immediately issuing the fetch indication to the back-end processing device when it is determined that buffer timeout has occurred.

7. The data processing method of claim 4, wherein when the batch-frame indication mechanism is enabled, the data processing method further comprises: dynamically adjusting the predetermined batch size.

* * * * *

UNITED STATES PATENT AND TRADEMARK OFFICE
CERTIFICATE OF CORRECTION

Page 1 of 1

PATENT NO. : 12,284,548 B2
APPLICATION NO. : 17/866575
DATED : April 22, 2025
INVENTOR(S) : Yu-Jui Wu et al.

It is certified that error appears in the above-identified patent and that said Letters Patent is hereby corrected as shown below:

On the Title Page

Add:
--(30) Foreign Application Priority Data
Aug. 12, 2021 (TW) ..................... 110129726--.

Signed and Sealed this
Ninth Day of September, 2025

Coke Morgan Stewart
*Acting Director of the United States Patent and Trademark Office*